US009592630B2

(12) United States Patent
Ito (10) Patent No.: US 9,592,630 B2
(45) Date of Patent: Mar. 14, 2017

(54) AUTOMATIC TEMPERATURE RISE CONTROL METHOD FOR MOLDING MACHINE

(75) Inventor: Takamichi Ito, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 1258 days.

(21) Appl. No.: 13/083,025

(22) Filed: Apr. 8, 2011

(65) Prior Publication Data

US 2011/0269084 A1 Nov. 3, 2011

(30) Foreign Application Priority Data

Apr. 28, 2010 (JP) ................... 2010-102939

(51) Int. Cl.
*F24F 11/00* (2006.01)
*F24D 19/10* (2006.01)
(Continued)

(52) U.S. Cl.
CPC .............. *B29C 45/78* (2013.01); *B29C 47/92* (2013.01); *B29C 47/0009* (2013.01);
(Continued)

(58) Field of Classification Search
CPC . B23Q 11/141; F25D 23/123; F25D 2400/04; F25D 11/022; G05D 23/1919;
(Continued)

(56) References Cited

U.S. PATENT DOCUMENTS 3,735,805 A * 5/1973 Stillhard ................... 165/256
3,979,699 A * 9/1976 Caragliano et al. .......... 333/116
(Continued)

FOREIGN PATENT DOCUMENTS

CN 1919579 2/2007
CN 101073913 11/2007
(Continued)

OTHER PUBLICATIONS

English Language Abstract of JP 2005-035090 published Feb. 10, 2005.
(Continued)

*Primary Examiner* — Len Tran
*Assistant Examiner* — Gordon Jones
(74) *Attorney, Agent, or Firm* — DLA Piper LLP US (57) ABSTRACT

A method for controlling temperature rise in divided heating zones of a barrel of a molding machine includes: setting tentative target temperatures for the respective heating zones; simultaneously raising temperatures in the heating zones to the set tentative target temperatures; when temperatures in the heating zones reach the respective tentative target temperatures, selecting a master zone from the heating zones, and selecting, as a slave zone, a heating zone which is other than the master zone among the heating zones; and after temperatures in the heating zones reach the respective tentative temperatures, raising the temperatures in the master zone and the slave zone to respective final target temperatures according to an attainment degree of temperature rise in the master zone.

2 Claims, 4 Drawing Sheets

(51) Int. Cl.
*G05D 23/275* (2006.01)
*B29C 45/78* (2006.01)
*B29C 47/92* (2006.01)
*B29C 47/00* (2006.01)
*B29C 47/82* (2006.01)

(52) U.S. Cl.
CPC ........ *B29C 47/0016* (2013.01); *B29C 47/827* (2013.01); *B29C 2945/76531* (2013.01); *B29C 2945/76668* (2013.01); *B29C 2945/76996* (2013.01); *B29C 2947/924* (2013.01); *B29C 2947/9298* (2013.01); *B29C 2947/92209* (2013.01); *B29C 2947/92485* (2013.01); *B29C 2947/92704* (2013.01); *B29C 2947/92895* (2013.01)

(58) Field of Classification Search
CPC ... B01L 7/00; F25B 41/04; C25D 5/34; C25D 7/12; F24F 11/0012; F24F 11/006; C09K 5/16; F26B 11/028; B29C 45/78; B29C 47/92; B29C 47/827; B29C 47/0009; B29C 47/0016; B29C 2945/76531; B29C 2945/76668; B29C 2945/76996; B29C 2947/92209; B29C 2947/924; B29C 2947/92485; B29C 2947/92704; B29C 2947/92895; B29C 2947/9298
USPC .......... 165/206, 263–264; 205/205; 236/1 B; 432/1
See application file for complete search history.

(56) References Cited

U.S. PATENT DOCUMENTS

| | | | | |
|---|---|---|---|---|
| 4,172,555 A | * | 10/1979 | Levine | 236/46 R |
| 5,272,644 A | * | 12/1993 | Katsumata et al. | 700/207 |
| 5,397,515 A | * | 3/1995 | Searle | G05D 23/1917 |
| | | | | 264/328.14 |
| 5,456,870 A | * | 10/1995 | Bulgrin | B29C 45/78 |
| | | | | 264/211.21 |
| 5,529,477 A | * | 6/1996 | Takizawa et al. | 425/143 |
| 5,853,631 A | * | 12/1998 | Linehan | B29C 45/78 |
| | | | | 264/328.14 |
| 6,080,346 A | * | 6/2000 | Jack | B29C 47/0026 |
| | | | | 264/143 |
| 6,861,018 B2 | * | 3/2005 | Koyama | B29C 45/78 |
| | | | | 264/40.6 |
| 7,618,566 B2 | * | 11/2009 | Pilavdzic | 264/40.6 |
| 7,653,460 B2 | * | 1/2010 | Manda et al. | 700/299 |
| 7,695,654 B2 | * | 4/2010 | Manda | 264/40.6 |
| 2007/0077327 A1 | * | 4/2007 | Matsumoto et al. | 425/548 |
| 2008/0039970 A1 | * | 2/2008 | Manda et al. | 700/202 |

FOREIGN PATENT DOCUMENTS

| | | |
|---|---|---|
| JP | 10-315291 A * | 12/1998 |
| JP | 2005-035090 | 2/2005 |

OTHER PUBLICATIONS

English Language Translation of JP 2005-035090 published Feb. 10, 2005.
Chinese Office Action issued in on 201110107708.3 dated May 2, 2013.
English Language Translation of Chinese Office Action issued in CN 201110107708.3 dated May 2, 2013.
English Language Abstract of CN1919579 published on Feb. 28, 2007.
English Language Abstract of CN101073913 published on Nov. 21, 2007.

* cited by examiner

AUTOMATIC TEMPERATURE RISE CONTROL METHOD FOR MOLDING MACHINE

CROSS REFERENCE TO RELATED APPLICATION

This application is based upon and claims the benefit of priority from the prior Japanese Patent Application No. 2010-102939, filed on Apr. 28, 2010, the entire contents of which are incorporated herein by reference.

BACKGROUND OF THE INVENTION

1. Field of the Invention

The present invention relates to an automatic temperature rise control method for a molding machine such as an extrusion molding machine or an injection molding machine.

2. Description of the Related Art

In an injection molding machine as an example of molding machines, a screw is rotatably disposed inside a heating cylinder (a barrel), and is movable back and forth in an axial direction inside the heating cylinder. A nozzle (an outlet port) is provided in a tip end portion of the heating cylinder, and multiple heaters are disposed on an outer peripheral portion of the heating cylinder. A driving motor rotates the screw, and thereby moves the screw back and forth inside the heating cylinder. Thereby, the screw heats and melts resin chips as a raw material inputted from a hopper into the cylinder, and concurrently ejects the melted resin from the nozzle. Thus, the molding is performed.

In this type of the molding machine, the outer peripheral portion of the heating cylinder is divided into multiple heating sections (also referred to as heating zones) in the axial direction and the heaters are disposed at the respective heating sections. A temperature sensor is located in the vicinity of each of the heaters. A temperature measuring unit receives inputs from the temperature sensors. The temperatures of the heaters are controlled by use of the temperatures of the heating sections measured by the temperature measuring unit and target temperatures stored by a target temperature setting unit. For raising the temperatures of the respective heating sections, the heating section that requires the longest time to reach a preset target temperature is set as a master section while the heating sections other than this master section are set as slave sections.

SUMMARY OF THE INVENTION

An automatic temperature rise control method for a molding machine disclosed in Japanese Patent Application Publication No. 2005-35090 is to raise temperatures of slave sections and a master section simultaneously in line with an attainment rate of the temperature of the master section to a preset target temperature. Specifically, time required for each of the heating sections to reach the preset target temperature is obtained with a self-tuning method, and the master section is determined in advance based on the required time. Then, the temperatures of the slave sections and the master section are raised simultaneously in line with the attainment rate of the temperature of the master section to the preset target temperature.

Such simultaneous temperature rise of the slave sections in line with the attainment rate of the temperature of the master section to the preset target temperature suppresses heat generation of the heaters in the slave sections right after a start of the temperature rise, even though the slave sections have higher temperature rise capacities than the master section, thereby decreasing an amount of heat to be transferred from the slave sections to the master section via the barrel. Hence, there is a problem that an extremely long time period is required until the master section and the slave sections of the barrel reach their respective final target temperatures and complete temperature rise at the same time.

An object of the present invention is to provide an automatic temperature rise control method which is capable of reducing time required until a master section (a master zone) and a slave section (a slave zone) of a barrel reach their respective final target temperatures and complete temperature rise.

An aspect of the present invention is a method for controlling temperature rise in divided heating zones of a barrel of a molding machine, the method comprising: setting tentative target temperatures for the respective heating zones; simultaneously raising temperatures in the heating zones to the set tentative target temperatures; when temperatures in the heating zones reach the respective tentative target temperatures, selecting a master zone from the heating zones, and selecting, as a slave zone, a heating zone which is other than the master zone among the heating zones; and after temperatures in the heating zones reach the respective tentative temperatures, raising the temperatures in the master zone and the slave zone to respective final target temperatures according to an attainment degree of temperature rise in the master zone.

According to the aspect, it is possible to reduce time required until the master section and the slave section of the barrel reach their respective final target temperatures and complete the temperature rises.

DETAILED DESCRIPTION OF THE EMBODIMENTS

Embodiments of the present invention will be described below in detail with reference to the accompanying drawings.

First Embodiment

Figure 1:
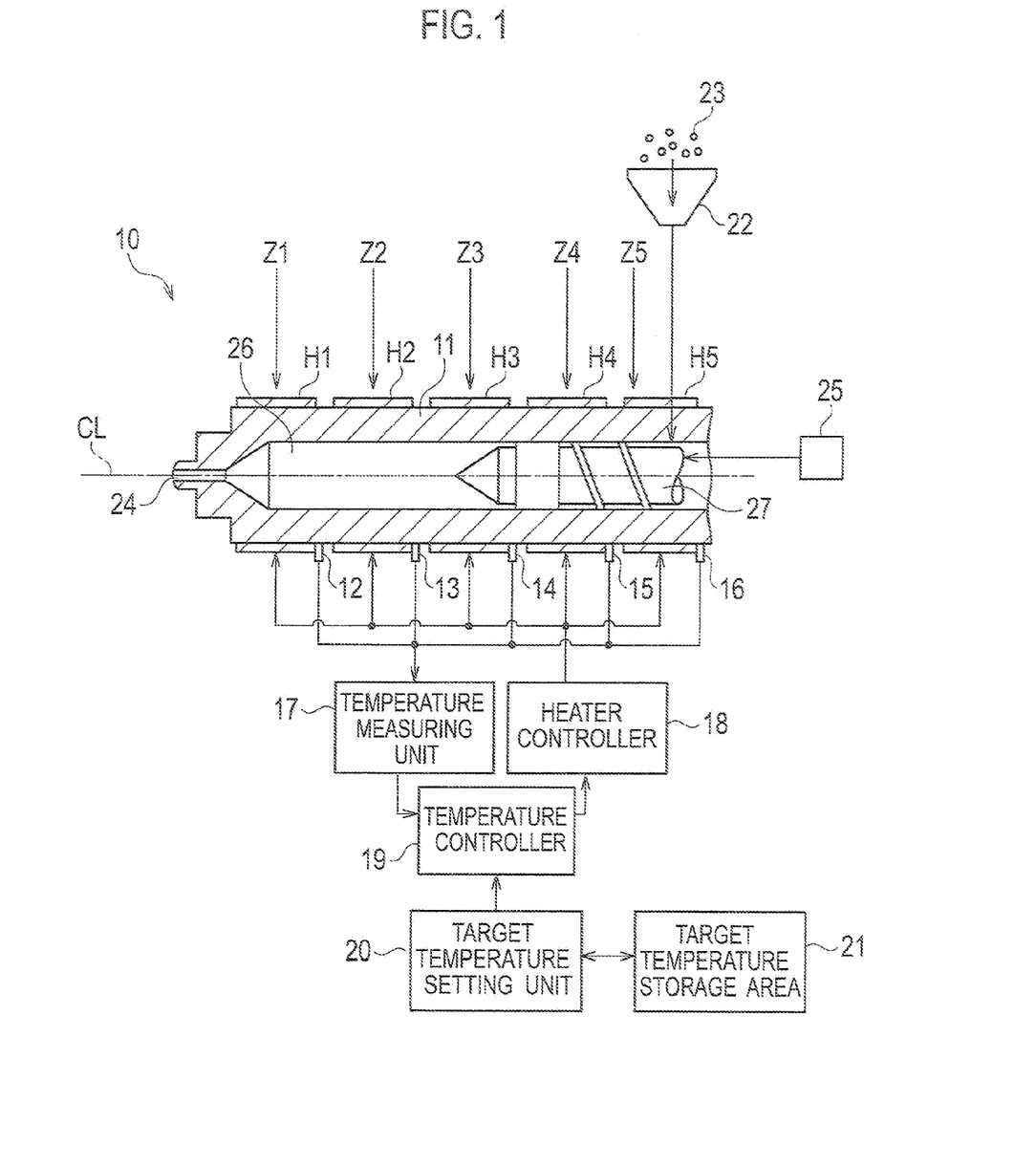
FIG. 1 is a diagram showing an example of a molding machine configured to carry out an automatic temperature rise control method of an embodiment of the present invention.

FIG. 1 shows a configuration example of a molding machine 10 configured to carry out an automatic temperature rise control method for a molding machine of an embodiment of the present invention.

The molding machine 10 shown in FIG. 1 is an injection molding machine. The molding machine 10 includes a heating cylinder 11, multiple heaters H1, H2, H3, H4, H5, multiple temperature sensors 12, 13, 14, 15, 16, a screw 27, a temperature measuring unit 17, a heater controller 18, a temperature controller 19, a target temperature setting unit 20, a target temperature storage area 21, and a hopper 22.

The molding machine 10 shown in FIG. 1 is an apparatus configured to perform injection molding while using resin chips 23 as a raw material. The heating cylinder 1, which is also referred to as a barrel, is a substantially cylindrical member. A nozzle (also referred to as an outlet port) 24 is provided on a tip end portion of the heating cylinder 11. The screw 27 is disposed inside the heating cylinder 11 in a way that the screw 27 is movable back and forth in an axial direction CL and rotatable when driven by a driving unit 25. The resin chips 23 supplied from the hopper 22 can be supplied to a material storage unit 26 inside the heating cylinder 11. Melted resin is injected from the nozzle 24 when the screw 27 rotates and moves in the axial direction CL.

As shown in FIG. 1, the multiple ring-shaped heaters H1 to H15 serving as heating bodies are disposed in the axial direction CL on an outer peripheral portion of the heating cylinder 11. The heaters H1 to H5 are respectively disposed at intervals, and divide the outer peripheral portion of the heating cylinder 11 into multiple heating sections Z1 to Z5. Specifically, the heaters H1 to H5 are provided in the respective heating sections Z1 to Z5, and the heating sections Z1 to Z5 are formed sequentially from the nozzle 24 side to the screw 27 side. In order to make the automatic temperature rise control method for a molding machine understood easily, descriptions will be provided in a way that: two heating sections are selected from the heating sections Z1 to Z5, for example; and, as explained later, these two selected heating sections are regarded as two heating sections CH1, CH2. The heating sections are also referred to as heating zones.

As shown in FIG. 1, the temperature sensors 12, 13, 14, 15, 16 are respectively disposed in the corresponding heating sections Z1 to Z5. Thereby, the temperature sensors 12, 13, 14, 15, 16 are capable of measuring temperatures of the corresponding heating sections Z1 to Z5, respectively.

The temperature measuring unit 17 is electrically connected to the temperature sensors 12, 13, 14, 15, 16. Temperature measurement signals representing results of measuring the temperatures of the heating sections Z1 to Z5 are inputted from the temperature sensors 12, 13, 14, 15, 16 to the temperature measuring unit 17, respectively.

As shown in FIG. 1, the heater controller 18 is electrically connected to the heaters H1, H2, H3, H4, H5. The heater controller 18 can cause the heaters H1, H2, H3, H4, H5 to generate heat individually by controlling power distribution to the heaters H1, H2, H3, H4, H5 individually.

As shown in FIG. 1, the temperature controller 19 is electrically connected to the temperature measuring unit 17 and the heater controller 18. The temperature controller 19, the temperature measuring unit 17, and the heater controller 18 collectively constitute a PID (proportional integral-derivative) controller. The temperature controller 19 is electrically connected to the target temperature setting unit 20. The target temperature setting unit 20 includes the target temperature storage area 21.

The target temperature setting unit 20 is capable of setting up values of tentative target temperatures and final target temperatures to be stored in advance in the target temperature storage area 21 as target temperatures of the heaters H1 to H5. For each of the multiple heating sections, its tentative target temperature and final target temperature can be set by the target temperature setting unit 20 individually. The temperature controller 19 controls the temperatures of the heaters H1 to H5 depending on the temperatures of the heating sections Z1 to Z5 measured by the temperature measuring unit 17 and on the tentative target temperatures and the final target temperatures stored by the target temperature setting unit 20, respectively.

Next, detailed descriptions will be provided for an automatic temperature rise control method for a molding machine of a first embodiment of the present invention which is carried out by using the molding machine 10 shown in FIG. 1.

Figure 2:
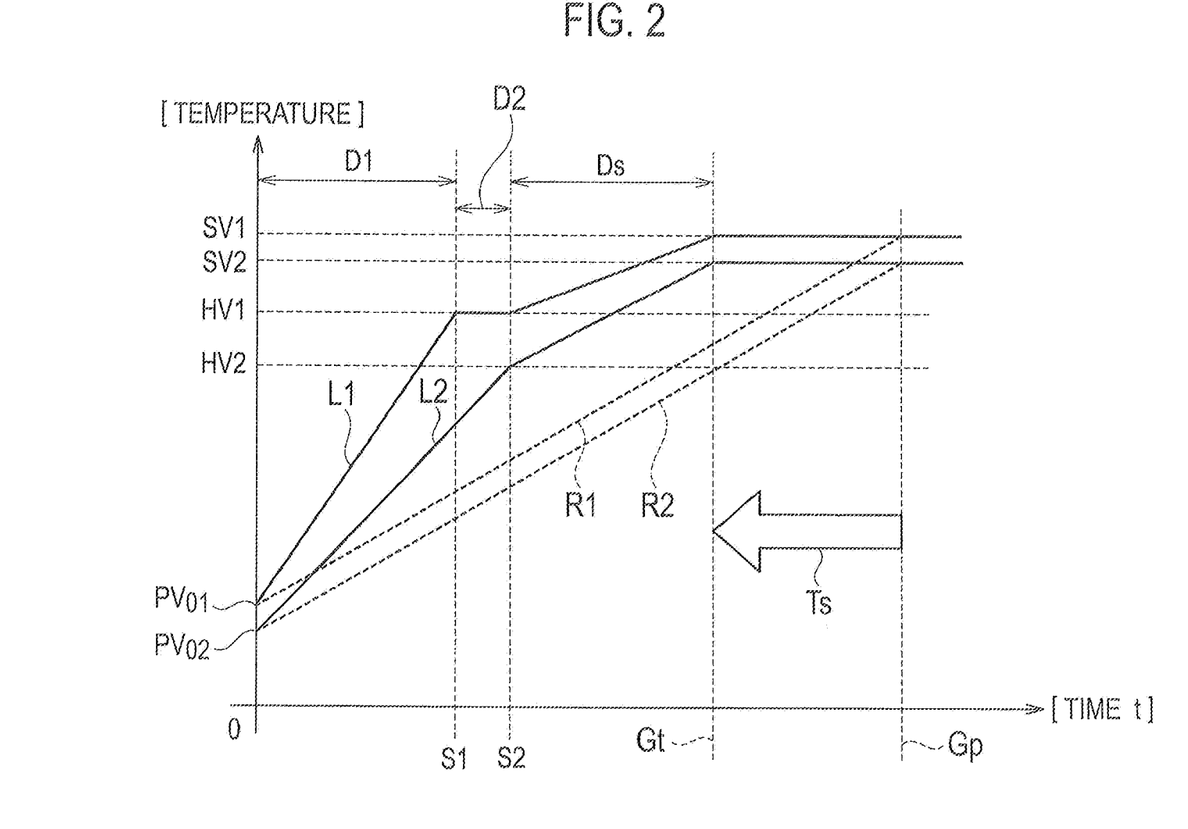
FIG. 2 is a graph showing how a temperature rises in a process example of the automatic temperature rise control method of the embodiment of the present invention and a conventional simultaneous temperature rising process.
Figure 3:
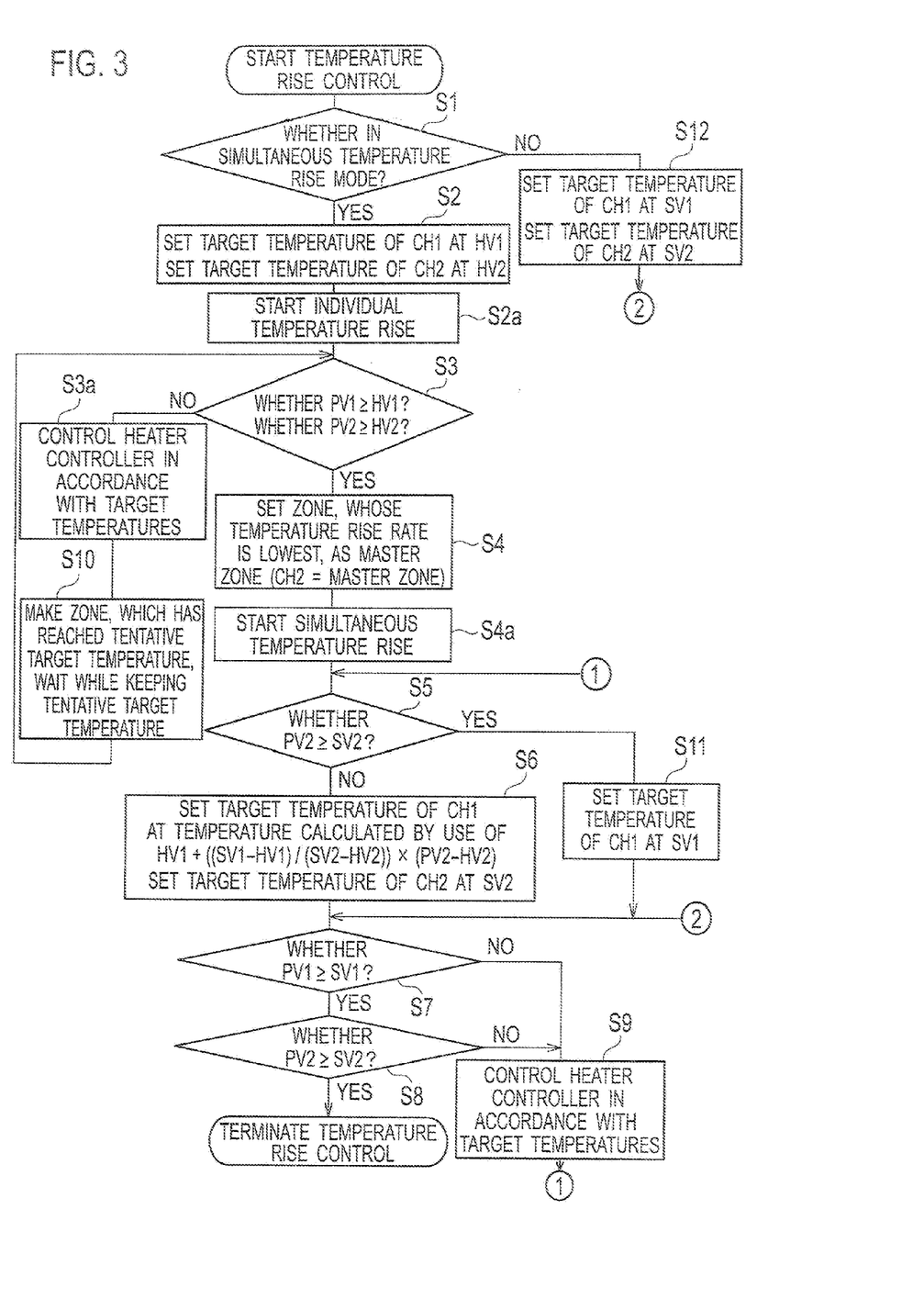
FIG. 3 is a flowchart showing a process of an automatic temperature rise control method for a molding machine of a first embodiment of the present invention.

FIG. 2 is a graph showing how a temperature rises in a process example of the automatic temperature rise control method of the embodiment of the present invention and a conventional simultaneous temperature rising process. In FIG. 2, a vertical axis indicates the temperature, while a horizontal axis indicates elapsed time. FIG. 3 is a flowchart showing a process of the automatic temperature rise control method for a molding machine according to the first embodiment of the present invention.

In FIG. 2, the final target temperature of the heating section CH1 is denoted by SV1, and the final target temperature of the heating section CH2 is denoted by SV2. The tentative target temperature of the heating section CH1 is denoted by HV1, and the tentative target temperature of the heating section CH2 is denoted by HV2. The final target temperature SV1 is higher than the final target temperature SV2, and the tentative target temperature HV1 is higher than the tentative target temperature HV2. The final target temperature SV2 is higher than the tentative target temperature HV1. A temperature rise starting point temperature of the heating section CH1 is denoted by $PV_{01}$, and a temperature rise starting point temperature of the heating section CH2 is denoted by $PV_{02}$.

In FIG. 2, temperature data lines L1, L2 representing the automatic temperature rise control method for a molding machine of the embodiment of the present invention are indicated with solid lines, while temperature data lines R1, R2 representing the conventional simultaneous temperature rise as a comparative example are indicated with dashed lines.

The temperature data line L1 indicated with the solid line in FIG. 2 shows how the temperature rises in the heating section CH1, while the temperature data line L2 indicated with the solid line in FIG. 2 shows how the temperature rises in the heating section CH2. The temperature data line R1 indicated with the dashed line in FIG. 2 shows how the temperature rises in the heating section CH1 in accordance with the simultaneous temperature rise as the conventional example, while the temperature data line R2 indicated with the dashed line in FIG. 2 shows how the temperature rises in the heating section CH2 in accordance with the simultaneous temperature rise as the conventional example. In the case of the conventional example, the temperatures of the heating section CH1 and the heating section CH2 are raised simultaneously, but not individually.

In FIG. 2, a simultaneous temperature rise off period from a temperature rise starting time, i.e., an individual temperature rise period from the temperature rise stating is denoted by D1, a subsequent individual temperature rise period is denoted by D2, and an ensuing simultaneous temperature rise time (a simultaneous temperature rise on period) is denoted by Ds. In this case, in the individual temperature rise period D1 and the subsequent individual temperature rise period D2, the temperature controller 19 shown in FIG. 1 gives an instruction to the heater controller 18. Thus, the heater controller 18 controls the power distribution to the heater of the heating section CH1 and the heater of the heating section CH2 individually, and thereby raises the temperatures of the respective heating sections CH1 and CH2 simultaneously in line with the attainment degrees of the temperature rise of the heating sections in the course of the temperature rise after the reaching of the tentative target temperatures and before the reaching of the final target temperatures.

In the example shown in FIG. 2, the heating section CH1 reaches the tentative target temperature HV1 at time S1 after starting at time 0, whereas the heating section CH2 reaches the tentative target temperature HV2 at time S2 which is later than time S1. In the individual temperature rise period D2, the temperature of the heating section CH1 is kept at the tentative target temperature HV1, whereas the temperature of the heating section CH2 continues rising, and reaches the tentative target temperature HV2 at time S2. In the simultaneous temperature rise period Ds, the temperature of the heating section CH1 continues rising and reaches the final target temperature SV1 at time Gt, while the temperature of the heating section CH2 continues rising and reaches the final target temperature SV2 at time Gt. Thereafter, the temperature of the heating section CH1 is kept at the final target temperature SV1, and the temperature of the heating section CH2 is kept at the final target temperature SV2.

On the other hand, in the case of the conventional example, the heating section CH1 and the heating section CH2 respectively reach the final target temperatures SV1, SV2 at time Gp as shown by the temperature data lines R1 and R2 indicated with the dashed lines. Time Gp is later than time Gt.

The flow showing the process of the automatic temperature rise control method for a molding machine of the first embodiment of the present invention shown in FIG. 3 includes step S1 to step S12.

In FIG. 3, the final target temperature of the heating section CH1 is denoted by SV1, and the final target temperature of the heating section CH2 is denoted by SV2. A current temperature of the heating section CH1 is denoted by PV1, and a current temperature of the heating section CH2 is denoted by PV2. The tentative target temperature of the heating section CH1 is denoted by HV1, and the tentative target temperature of the heating section CH2 is denoted by HV2.

Here, the automatic temperature rise control method for a molding machine of the first embodiment of the present invention which is carried out by using the molding machine 10 shown in FIG. 1 will be described with reference to FIG. 1 and FIG. 2 and in accordance with the steps shown in an operation flowchart of a simultaneous temperature rise control function shown in FIG. 3. This example shows a case where the heating section CH2 is set as a master section (a master zone) and the heating section CH1 is set as a slave section (a slave zone) in the course of an operation flow.

In FIG. 3, once the temperature rise control is started, a judgment is made in step S1 as to whether or not the temperature controller 19 shown in FIG. 1 is set to a simultaneous temperature rise mode. The process goes to step S2 if the temperature controller 19 is set to the simultaneous temperature rise mode.

In step S2 in FIG. 3, as shown in FIG. 2, the target temperature of the heating section CH1 is preset at the tentative target temperature HV1 shown in FIG. 2, and the target temperature of the heating section CH2 is preset at the tentative target temperature HV2 shown in FIG. 2. Thereafter, in step S2a, the individual temperature rise is started in both of the heating sections CH1, CH2. The individual temperature rise starting point temperature of the heating section CH1 is denoted by $PV_{01}$, and the individual temperature rise starting point temperature of the heating section CH2 is denoted by $PV_{02}$.

In step S3 shown in FIG. 3, a judgment is made as to whether or not the current temperature PV1 of the heating section CH1 is equal to or above the tentative target temperature HV1 of the heating section CH1, and a judgment is made as to whether or not the current temperature PV2 of the heating section CH2 is equal to or above the tentative target temperature HV2 of the heating section CH2. In other words, the judgment is made as to whether or not the current temperature PV1 of the heating section CH1 reaches the tentative target temperature HV1 of the heating section CH1, and the judgment is made as to whether or not the current temperature PV2 of the heating section CH2 reaches the tentative target temperature HV2 of the heating section CH2. In step S3, if the current temperature PV1 of the heating section. CH1 becomes equal to or above the tentative target temperature. HV1 of the heating section CH1, the current temperature PV2 of the heating section CH2 becomes equal to or above the tentative target temperature HV2 of the heating section CH2, and all the heating sections (all the zones) reach their respective tentative target temperatures, then the process goes to step S4. If all the sections (all the zones) have not reached their respective tentative target temperatures yet, the process goes to step S3a, where the temperature controller 19 shown in FIG. 1 controls the heater controller 18 in accordance with the target temperatures of the heating section CH1 and the heating section CH2. Thereafter, in step S10, the heating section CH1, which has reached the tentative target temperature earlier, is made to wait while keeping this tentative target temperature HV1, as shown in FIG. 2.

In step S4 shown in FIG. 3, the heating section CH2 having the lowest rate of temperature rise in the individual temperature rise period D1 shown in FIG. 2 is set as the master section (the master zone). Specifically, because in the individual temperature rise period D1, the rate of temperature rise represented by the temperature data line L2 is lower than the rate of temperature rise represented by the temperature data line L1, the heating section CH2 is set as the master section, and the heating section CH1 is set as the slave section (the slave zone).

Moving to step S4a, the simultaneous temperature rise of the heating section (the slave section) CH1 and the heating section (the master section) CH2 is started. Then, in step S5, a judgment is made as to whether or not the current temperature PV2 of the heating section CH2 is equal to or above the final target temperature SV2 of the heating section CH2. In other words, the judgment is made as to whether or not the current temperature PV2 of the heating section CH2 reaches the final target temperature SV2 of the heating section CH2. The process goes to step S6, if the current temperature PV2 of the heating section CH2 has not reached the final target temperature SV2 of the heating section CH2.

In step S6, a target temperature calculated by use of the following formula is set as the target temperature of the heating section CH1.

$$HV1+((SV1-HV1)/(SV2-HV2))\times(PV2-HV2)$$

Meanwhile, the target temperature of the heating section CH2 is set at the final target temperature SV2.

In step S7 shown in FIG. 3, a judgment is made as to whether or not the current temperature PV1 of the heating section CH1 is equal to or above the final target temperature.

SV1 of the heating section CH1. In other words, the judgment is made as to whether or not the heating section CH1 has reached the final target temperature SV1. If the current temperature PV1 of the heating section CH1 has not reached the final target temperature SV1 of the heating section CH1, the temperature controller 19 shown in FIG. 1 controls the heater controller 18 in accordance with the target temperatures of the heating section CH1 and the heating section CH2 in step S9. Then, the process goes back to step S5, and the steps in and after step S5 are executed.

On the other hand, the process goes to step S8 if the current temperature PV1 of the heating section CH1 has reached the final target temperature SV1 of the heating section CH1 in step S7.

In step S8, a judgment is made as to whether or not the current temperature PV2 of the heating section CH2 is equal to or above the final target temperature SV2 of the heating section CH2. In other words, the judgment is made as to whether or not the heating section CH2 has reached the final target temperature SV2. If the current temperature PV2 of the heating section CH2 has not reached the final target temperature SV2 of the heating section CH2, the process goes to step S9, where the temperature controller 19 shown in FIG. 1 controls the heater controller 18 in accordance with the target temperatures of the heating section CH1 and the heating section CH2. Then, the process goes back to step S5, and the steps in and after step S5 are executed. The temperature rise control is terminated if the current temperature PV2 of the heating section CH2 has reached the final target temperature SV2 of the heating section CH2 in step S8.

On the other hand, if the current temperature PV2 of the heating section CH2 is equal to or above the final target temperature SV2 of the heating section CH2 in step S5, i.e., if the current temperature PV2 of the heating section CH2 has reached the final target temperature SV2 of the heating section CH2, the final target temperature SV1 of the heating section CH1 is set as the target temperature of the heating section CH1 in step S11. Then, the process goes to step S7. Thereafter, the steps in and after step S7 are executed.

If the temperature controller 19 is not set in the simultaneous temperature rise mode in step S1, the target temperature of the heating section CH1 is set at the final target temperature SV1 of the heating section CH1, and the target temperature of the heating section CH2 is set at the final target temperature SV2 of the heating section CH2 in step S12. Then, the process goes to step S7. Thereafter, the steps in and after step S7 are executed.

Now, characteristic features of the automatic temperature rise control method for a molding machine of the first embodiment of the present invention will be described further in detail with reference to FIG. 2 and FIG. 3.

In the above-described automatic temperature rise control method for a molding machine of the first embodiment of the present invention, either the heating section CH1 or the heading section CH2 need not be determined as the master section or the slave section in advance. Instead, the method is configured to set the heating section CH2 and the heating section CH1 as the master section and the slave section, respectively, in step S4 of the automatic temperature rise control flow shown in FIG. 3.

In the individual temperature rise period D1 shown in FIG. 2, as illustrated with the temperature data line L1 indicated with the solid line, the temperature rise of the heating section CH1 is started at the temperature rise starting point temperature $PV_{01}$, and the heating section CH1 is fully heated up to the tentative target temperature HV1. Meanwhile, as illustrated with the temperature data line L2 indicated with the solid line, the temperature rise of the heating section CH2 is started at the temperature rise starting point temperature $PV_{02}$, and the heating section CH2 is fully heated up to the tentative target temperature HV2. As described above, the temperature controller 19 shown in FIG. 1 gives the instruction to the heater controller 19, and thus, the temperatures of the heating section CH1 and the heating section CH2 are raised individually.

To this end, in step S4 of the automatic temperature rise control flow shown in FIG. 3, the heating section (zone) having the lowest rate of temperature rise until reaching the tentative target temperature is set as the master section (the master zone), and the other heating section (zone) is set as the slave section (the slave zone). In other words, the heating section CH2 is set as the master section, and the heating section CH1 is set as the slave section.

Then, once the heating section CH1 reaches the tentative target temperature HV1, the heating section CH2 reaches the tentative target temperature HV2, and the master section is determined, the temperature of the heating section CH1 as the slave section is subsequently simultaneously raised to the final target temperature SV1 in line with the temperature rise of the heating section CH2 as the master section in the simultaneous temperature rise on period Ds. Specifically, in the simultaneous temperature rise on period Ds, the heating section CH1 is again heated from the tentative target temperature HV1 to the real final target temperature SV1, while the heating section CH2 is again heated from the tentative target temperature HV2 to the real final target temperature SV2. In this case, the temperature of the heating section CH1 as the slave section is raised (simultaneously raised) in line with a rate of attainment of a target set temperature (the attainment degree of the temperature rise) of the heating section CH2 as the master section.

On the other hand, in the case of the conventional simultaneous temperature rise shown in FIG. 2, the temperature of the slave section is simply raised from the temperature rise starting point temperature PV01 to the final target temperature SV1 in line with the rate of attainment of the target set temperature of the master section, as illustrated with the temperature data lines R1, R2 indicated with the dashed lines.

In the automatic temperature rise control method for a molding machine of the first embodiment of the present invention, individual capacities of the heating section CH1 and the heating section CH2 are fully utilized immediately after the start of the temperature rise without the heating section CH1, which has a higher temperature rise capacity than the heating section CH2, conformed to the attainment degree of temperature rise of the heating section CH2. For this reason, the heating section CH1 quickly reaches the set tentative target temperature HV1 at the end of the individual temperature rise period D1. In addition, both of the heating section CH2 and the heating section CH1 are located on the single barrel (the heating cylinder 11) shown in FIG. 1, and the heat is transferred from a position having a higher temperature to a position having a lower temperature. For this reason, as the temperature of the heating section CH1 is raised more quickly, an amount of heat flowing from the heating section CH1 to the heating section CH2 is increased.

As described above, the amount of heat flowing form the heating section CH1 to the heating section CH2 is increased as the temperature of the heating section CH1 is raised more quickly. Accordingly, the comparison between the embodiment of the present invention shown in FIG. 2 and the conventional simultaneous temperature rise method shows that time Gt at which the temperature rise is completed in the first embodiment of the present invention when the heating section CH1 reaches the final target temperature SV1 and the heating section CH2 reaches the final target temperature SV2 becomes earlier by a time period Ts than time Gp at which the temperature rise is completed in the conventional temperature rise method when the heating section CH1 reaches the final target temperature SV1 and the heating section CH2 reaches the final target temperature SV2. Thereby, it is possible to accelerate a start-up operation of the molding machine 10.

Second Embodiment

An automatic temperature rise control method for a molding machine of a second embodiment of the present invention which is carried out by using the molding machine 10 shown in FIG. 1 will be described in detail with reference to FIG. 2 and FIG. 4.

In the second embodiment of the present invention, the molding machine 10 shown in FIG. 1 is used, and the process example of the automatic temperature rise control method for a molding machine of the embodiment of the present invention shown in FIG. 2 is used. FIG. 4 is a flowchart showing a process of the automatic temperature rise control method of a molding machine of the second embodiment of the present invention. The flow showing the process of the automatic temperature rise control method for a molding machine of the second embodiment of the present invention illustrated in FIG. 4 includes step S21 to Step S32. This example shows the case where in the course of the operation flow, the heating section CH2 is set as the master section (master zone) while the heating section CH1 is set as the slave section (slave zone).

Figure 4:
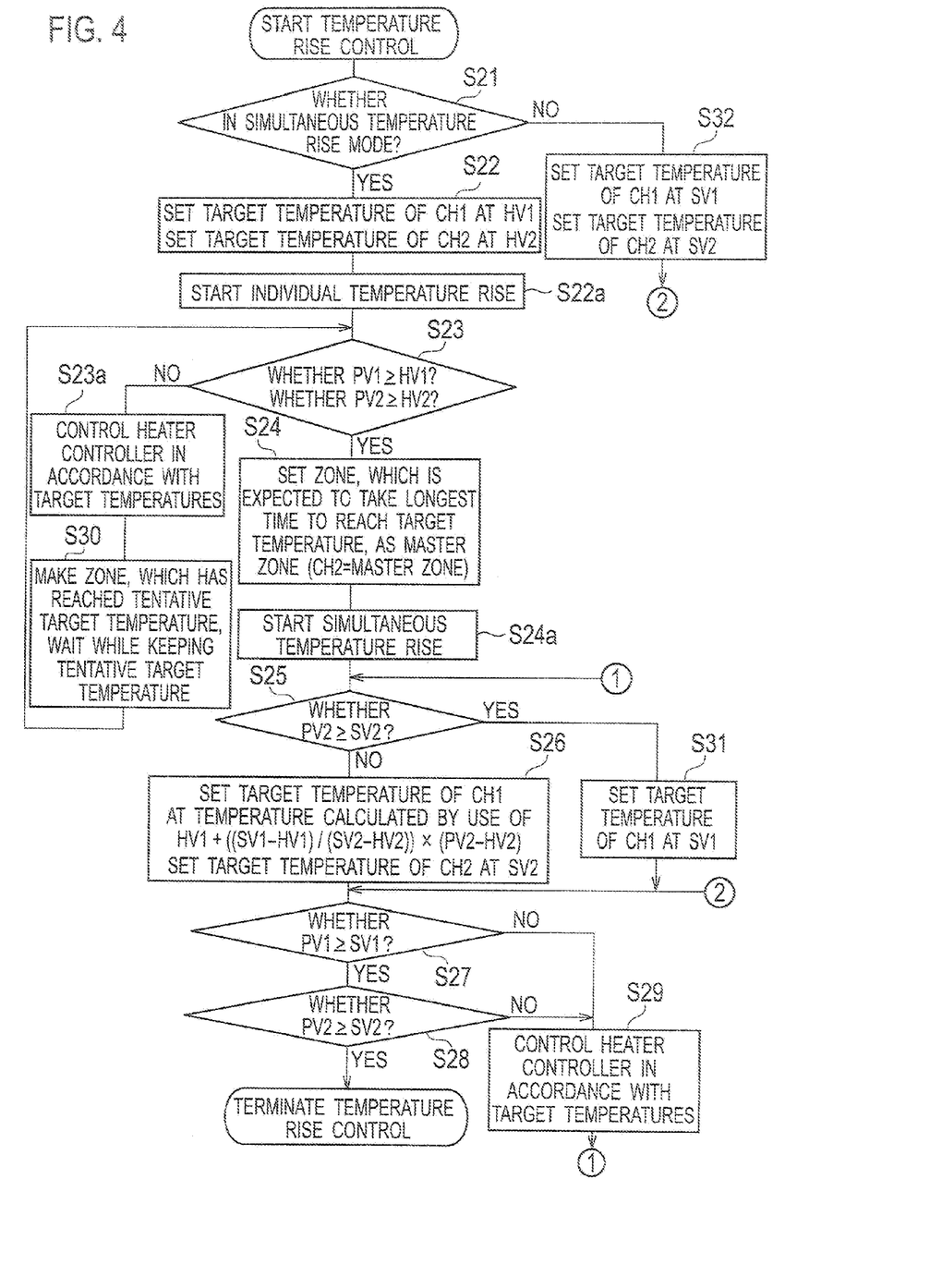
FIG. 4 is a flowchart showing a process of an automatic temperature rise control method for a molding machine of a second embodiment of the present invention.

In FIG. 4, once the temperature rise control is started, a judgment is made in step S21 as to whether or not the temperature controller 19 shown in FIG. 1 is set to a simultaneous temperature rise mode. The process goes to step S22 if the temperature controller 19 is set to the simultaneous temperature rise mode.

In step S22 in FIG. 4, as shown in FIG. 2, the target temperature of the heating section CH1 is preset at the tentative target temperature HV1 shown in FIG. 2, and the target temperature of the heating section CH2 is preset at the tentative target temperature HV2 shown in FIG. 2. Thereafter, in step S22a, the individual temperature rise is started in both of the heating sections CH1, CH2. The individual temperature rise starting point temperature of the heating section CH1 is denoted by $PV_{01}$, and the individual temperature rise starting point temperature of the heating section CH2 is denoted by $PV_{02}$.

In step S23 shown in FIG. 4, a judgment is made as to whether or not the current temperature PV1 of the heating section CH1 is equal to or above the tentative target temperature HV1 of the heating section CH1, and a judgment is made as to whether or not the current temperature PV2 of the heating section CH2 is equal to or above the tentative target temperature HV2 of the heating section CH2. In other words, the judgment is made as to whether or not the current temperature PV1 of the heating section CH1 reaches the tentative target temperature HV1 of the heating section CH1, and the judgment is made as to whether or not the current temperature PV2 of the heating section CH2 reaches the tentative target temperature HV2 of the heating section CH2. In step S23, if the current temperature PV1 of the heating section CH1 becomes equal to or above the tentative target temperature HV1 of the heating section CH1, the current temperature PV2 of the heating section CH2 becomes equal to or above the tentative target temperature HV2 of the heating section CH2, and all the heating sections (all the zones) have reached their respective tentative target temperatures, then the process goes to step S24. If all the sections (all zones) have not reached their respective tentative target temperatures yet, the process goes to step S23a, where the temperature controller 19 shown in FIG. 1 controls the heater controller 18 in accordance with the target temperatures of the heating section CH1 and the heating section CH2. Thereafter, in step S30, the heating section CH1, which has reached the tentative target temperature earlier, is made to wait while keeping this tentative target temperature HV1, as shown in FIG. 2.

In step S24 in FIG. 4, the heating section CH2, which is expected to take the longest time (i.e., to be the slowest) to reach the final target temperature judging from the development in the individual temperature rise period D1 shown in FIG. 2, is set as the master section (the master zone). Specifically, based on the development in the individual temperature rise period D1, it is estimated that the temperature data line L2 requires the longest time for reaching the final target temperature as compared to the temperature data line L1. For this reason, the heating section CH2 is set as the master section, and the heating section CH1 is set as the slave section (the slave zone).

Here, the following formulae are obtained where a time period required for the heating section CH1 to reach the target temperature HV1 is denoted by t1, a time period required for the heating section CH2 to reach the target temperature HV2 is denoted by t2, an estimated time period for the heating section CH1 to reach the target is denoted by T1, and an estimated time period for the heating section CH2 to reach the target is denoted by T2. Incidentally, let us assume T1<T2.

Estimated time period for the heating section CH1 to reach the target: $T1=(SV1-HV1)/\{(HV1-PV_{01})/t1\}$ Estimated time period for the heating section CH2 to reach the target: $T2=(SV2-HV2)/\{(HV2-PV_{02})/t2\}$ Moving to step S24a in FIG. 4, the simultaneous temperature rise of the heating section (the slave section) CH1 and the heating section (the master section) CH2 is started. Then, in step S25, a judgment is made as to whether or not the current temperature PV2 of the heating section CH2 is equal to or above the final target temperature SV2 of the heating section CH2. In other words, the judgment is made as to whether or not the current temperature PV2 of the heating section CH2 has reached the final target temperature SV2 of the heating section CH2. If the current temperature PV2 of the heating section CH2 has not reached the final target temperature SV2 of the heating section CH2 yet, the process proceeds to step S26.

In step S26, the target temperature calculated by use of the following formula is set as the target temperature of the heating section CH1.

$$HV1+((SV1-HV1)/(SV2-HV2))\times(PV2-HV2)$$

Meanwhile, the target temperature of the heating section CH2 is set at the final target temperature SV2.

In step S27 shown in FIG. 4, a judgment is made as to whether or not the current temperature PV1 of the heating section CH1 is equal to or above the final target temperature SV1 of the heating section CH1. In other words, the judgment is made as to whether or not the current temperature PV1 of the heating section CH1 has reached the final target temperature SV1. If the current temperature PV1 of the heating section CH1 has not reached the final target temperature SV1 of the heating section CH1, the temperature controller 19 shown in FIG. 1 controls the heater controller 18 in accordance with the target temperatures of the heating section CH1 and the heating section CH2 in step S29. Then, the process goes back to step S25, and the steps in and after step S25 are executed.

On the other hand, the process goes to step S28 if the current temperature PV1 of the heating section CH1 has reached the final target temperature. SV1 of the heating section CH1 in step S27.

In step S28, a judgment is made as to whether or not the current temperature PV2 of the heating section CH2 is equal to or above the final target temperature SV2 of the heating section CH2. In other words, the judgment is made as to whether or not the current temperature PV2 of the heating section CH2 has reached the final target temperature SV2. If the current temperature PV2 of the heating section CH2 has not reached the final target temperature SV2 of the heating section CH2, the process goes to step S29, where the temperature controller 19 shown in FIG. 1 controls the heater controller 18 in accordance with the target temperatures of the heating section CH1 and the heating section CH2. Then, the process goes back to step S25, and the steps in and after step S25 are executed. The temperature rise control is terminated if the current temperature PV2 of the heating section CH2 has reached the final target temperature SV2 of the heating section CH2 in step S28.

On the other hand, if the current temperature PV2 of the heating section CH2 is equal to or above the final target temperature SV2 of the heating section CH2 in step S25, i.e., if the current temperature PV2 of the heating section CH2 has reached the final target temperature SV2 of the heating section CH2, the final target temperature SV1 of the heating section CH1 is set as the target temperature of the heating section CH1 in step S31. Then, the process goes to step S27. Thereafter, the steps in and after step S27 are executed.

If the temperature controller 19 is not set in the simultaneous temperature rise mode in step S21, the target temperature of the heating section CH1 is set at the final target temperature SV1 of the heating section CH1, and the target temperature of the heating section CH2 is set at the final target temperature SV2 of the heating section CH2 in step S32. Then, the process goes to step S27. Thereafter, the steps in and after step S27 are executed.

Now, characteristic features of the automatic temperature rise control method for a molding machine of the second embodiment of the present invention will be described further in detail with reference to FIG. 2 and FIG. 4.

In the above-described automatic temperature rise control method for a molding machine of the second embodiment of the present invention, either the heating section CH1 or the heating section CH2 need not be determined as the master section or the slave section in advance. Instead, the method is configured to set the heating section CH2 and the heating section CH1 as the master section and the slave section, respectively, in step S24 of the automatic temperature rise control flow shown in FIG. 4.

In the individual temperature rise period D1 shown in FIG. 2, as illustrated with the temperature data line L1 indicated with the solid line, the temperature rise of the heating section CH1 is started at the temperature rise starting point temperature $PV_{01}$, and the heating section CH1 is fully heated up to the tentative target temperature HV1. Meanwhile, as illustrated with the temperature data line L2 indicated with the solid line, the temperature rise of the heating section CH2 is started at the temperature rise starting point temperature $PV_{02}$, and the heating section CH2 is fully heated up to the tentative target temperature HV2. As described above, the temperature controller 19 shown in FIG. 1 gives the instruction to the heater controller 19, and thus, the temperatures of the heating section CH1 and the heating section CH2 are raised individually.

To this end, in step S24 of the automatic temperature rise control flow shown in FIG. 4, the heating section (zone) which is expected to be the slowest in reaching the tentative target temperature is set as the master section (the master zone), and the other heating section (zone) is set as the slave section (the slave zone). In other words, the heating section CH2 is set as the master section, and the heating section CH1 is set as the slave section.

Then, once the heating section. CH1 reaches the tentative target temperature HV1, the heating section CH2 reaches the tentative target temperature HV2, and the master section is determined, the temperature of the heating section CH1 as the slave section is subsequently simultaneously raised to the final target temperature SV1 in line with the temperature rise of the heating section CH2 as the master section in the simultaneous temperature rise on period Ds. Specifically, in the simultaneous temperature rise on period Ds, the heating section CH1 is again heated from the tentative target temperature HV1 to the real final target temperature SV1, while the heating section CH2 is again heated from the tentative target temperature HV2 to the real final target temperature SV2. In this case, the temperature of the heating section CH1 as the slave section is raised (simultaneously raised) in line with a rate of attainment of a target set temperature (the attainment degree of the temperature rise) of the heating section CH2 as the master section.

On the other hand, in the case of the conventional simultaneous temperature rise shown in FIG. 2, the temperature of the slave section is simply raised from the temperature rise starting point temperature PV01 up to the final target temperature SV1 in line with the rate of attainment of the target set temperature of the master section, as illustrated with the temperature data lines R1, R2 indicated with the dashed lines.

In the automatic temperature rise control method for a molding machine of the second embodiment of the present invention, individual capacities of the heating section CH1 and the heating section CH2 are fully utilized immediately after starting the temperature rise without the heating section CH1, which has a higher temperature rise capacity than that of the heating section CH2, conformed to the attainment degree of temperature rise of the heating section CH2. For this reason, the heating section CH1 quickly reaches the set tentative target temperature HV1 at the end of the individual temperature rise period D1. In addition, both of the heating sections CH2 and CH1 are located on the single barrel (the heating cylinder 11) shown in FIG. 1, and the heat is transferred from a position having a higher temperature to a position having a lower temperature. For this reason, as the temperature of the heating section CH1 is raised more quickly, an amount of heat flowing from the heating section CH1 to the heating section CH2 is increased.

As described above, the amount of heat flowing from the heating section CH1 to the heating section CH2 is increased as the temperature of the heating section CH1 is raised more quickly. Accordingly, the comparison between the embodiment of the present invention shown in FIG. 2 and the conventional simultaneous temperature rise method shows that time Gt at which the temperature rise is completed in the second embodiment of the present invention when the heating section CH1 reaches the final target temperature SV1 and the heating section CH2 reaches the final target temperature SV2 becomes earlier by a time period Ts than time Gp at which the temperature rise is completed in the conventional temperature rise method when the heating section CH1 reaches the final target temperature SV1 and the heating section CH2 reaches the final target temperature SV2. Thereby, it is possible to accelerate a start-up operation of the molding machine 10.

In the above-described embodiment of the present invention, the simultaneous temperature rise in the multiple heating sections (the heating zones) is achieved by: starting their temperature rise after setting their respective tentative target temperatures in advance; selecting the master section from the multiple heating sections at the time when the multiple heating sections reach the tentative target temperature; and setting the heating section other than the master section as the slave section. Thereafter, the temperature rise after the heating sections reach their tentative target temperatures until the heating sections reach their final target temperatures is achieved by controlling the temperature rise in the master section and the slave section on the basis of the rate of attainment of the target set temperature (the attainment degree of temperature rise) of the master section. In the above-described embodiment of the present invention, as described above, the tentative target temperatures are preset for the respective heating sections. As a consequence, unlike the conventional example, the above-described embodiment of the present invention makes no longer necessary a preliminary process of collecting the temperature rise data on the heating sections in advance by means of self-tuning; and determining the master section in advance. Moreover, in the above-described embodiment of the present invention, the heating sections are individually heated to their respective tentative target temperatures. For this reason, the heating capacities of the respective heating sections can be fully utilized without conforming to the attainment degree of temperature rise of the master section. Hence, the heating sections reach their respective tentative target temperatures earlier.

Both of the master section and the slave section are located on the single barrel (the cylinder), and the heat is transferred from the heating section having a higher temperature to the heating section having a lower temperature. For this reason, as the temperature of the slave section is raised more quickly, an amount of heat flowing from the slave section to the master section is increased, whereby the time needed for temperature rise of the master section is shortened. Hence, the embodiment of the present invention can make the temperature rise time shorter than the prior art.

The present invention is not limited to the above-described embodiments. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiment of the present invention are only a list of optimum effects achieved by the present invention. Hence, the effects of the present invention are not limited to those described in the embodiment of the present invention.

The molding machine 10 illustrated in FIG. 1 is shown as the example of combining the five heaters H1 to H5 and the five temperature sensors 12 to 16. However, the present invention is not limited to this configuration. A combination of two heaters and two temperature sensors, a combination of three heaters and three temperature sensors, a combination of four heaters and four temperature sensors, or a combination of six or more heaters and six or more temperature sensors may be adopted. The molding machine may be an injection molding machine or an extrusion molding machine.

What is claimed is:

1. A method for controlling temperature rise in divided heating zones of a barrel of a molding machine, the method comprising:
   setting tentative target temperatures and final target temperatures for the respective heating zones;
   simultaneously starting to raise temperatures in the heating zones and then individually raising the temperature in each of the heating zones to the set tentative target temperatures;
   determining whether the temperatures in each of the heating zones have become equal to or greater than the respective tentative target temperatures through the individual raising of the temperatures;
   holding the tentative target temperature of the heating zone which has reached its tentative target temperature earlier than the other heating zones until all the temperatures of the other heating zones reach the respective tentative target temperatures;
   upon determination that all the temperatures in the heating zones are equal to or greater than the respective tentative target temperatures, selecting a master zone from the heating zones, and selecting, as a slave zone, a heating zone which is other than the master zone among the heating zones, wherein the selecting of the master zone comprises selecting a heating zone having a lowest rate of temperature rise among the heating zones as the master zone or selecting a heating zone expected to be a slowest in reaching a final target temperature thereof from a tentative target temperature thereof among the heating zones as the master zone;
   immediately after the temperature in the selected master zone reaches the tentative target temperature, raising the temperature in the selected master zone and raising the temperature in the selected slave zone from the respective tentative target temperatures to the respective final target temperatures, wherein a rate of increase of temperature in the selected slave zone is set according to a rate of increase of temperature in the selected master zone; and
   holding the final target temperatures in each of the heating zones.

2. The method of claim 1, further comprising preparing a molding machine comprising:
   heaters respectively provided in the heating zones;
   temperature sensors respectively provided in the heating zones;
   a temperature measuring unit configured to receive inputs from the temperature sensors;
   a heater controller configured to control the heaters;
   a target temperature setting unit configured to set and store target temperatures of the heaters; and
   a temperature controller configured to control temperatures of the heaters based on temperatures in the heating zones measured by the temperature measuring unit and the target temperatures stored by the target temperature setting unit.

* * * * *